(12) United States Patent
Chernov et al.

(10) Patent No.: US 10,173,905 B2
(45) Date of Patent: *Jan. 8, 2019

(54) SYSTEM FOR DETECTING A LIQUID AND A WATER FILTER ASSEMBLY

(71) Applicant: General Electric Company, Schenectady, NY (US)

(72) Inventors: Gregory Sergeevich Chernov, Louisville, KY (US); Andrew Reinhard Krause, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,759

(22) Filed: Apr. 10, 2014

(65) Prior Publication Data

US 2015/0290567 A1 Oct. 15, 2015

(51) Int. Cl.
*B01D 35/143* (2006.01)
*G06K 7/10* (2006.01)
*C02F 1/00* (2006.01)
*F25D 23/00* (2006.01)
*F25D 23/12* (2006.01)
*C02F 1/28* (2006.01)

(52) U.S. Cl.
CPC .............. *C02F 1/003* (2013.01); *F25D 23/00* (2013.01); *B01D 2201/52* (2013.01); *C02F 1/28* (2013.01); *C02F 2201/006* (2013.01); *C02F 2209/00* (2013.01); *C02F 2209/445* (2013.01); *C02F 2307/10* (2013.01); *F25D 23/126* (2013.01); *F25D 2323/121* (2013.01); *F25D 2700/08* (2013.01)

(58) Field of Classification Search
CPC combination set(s) only.
See application file for complete search history.

(56) References Cited

U.S. PATENT DOCUMENTS

| | | |
|---|---|---|
| 3,995,636 A | 12/1976 | Murray et al. |
| 4,855,077 A | 8/1989 | Shikinami et al. |
| 5,089,144 A | 2/1992 | Ozkahyaoglu et al. |
| 5,135,645 A | 8/1992 | Sklenak et al. |
| 5,171,430 A | 12/1992 | Beach et al. |

(Continued)

FOREIGN PATENT DOCUMENTS

| | | |
|---|---|---|
| EP | 1936305 A2 | 6/2008 |
| JP | 2001016025 A | 1/2001 |

(Continued)

OTHER PUBLICATIONS

Machine Translation of JP2006258684 from WIPO.*

(Continued)

*Primary Examiner* — Bobby Ramdhanie
*Assistant Examiner* — Michael J An
(74) *Attorney, Agent, or Firm* — Dority & Manning, P.A.

(57) ABSTRACT

A system for detecting a liquid, such as liquid water, is provided. The system includes an RFID tag and an absorbent material positioned over the RFID tag. The system also includes features for hindering or preventing compression of the absorbent material and/or for spacing the RFID tag from the absorbent material. A water filter assembly with features for detecting water leaks is also provided.

9 Claims, 11 Drawing Sheets

(56) References Cited

U.S. PATENT DOCUMENTS

| | | | |
|---|---|---|---|
| 5,190,666 A | 3/1993 | Bisconte | |
| 5,192,424 A | 3/1993 | Beyne et al. | |
| 5,328,597 A | 7/1994 | Boldt, Jr. et al. | |
| 5,536,264 A | 7/1996 | Hsueh et al. | |
| 5,907,958 A | 6/1999 | Coates et al. | |
| 6,009,404 A | 12/1999 | Eimer | |
| 6,051,144 A | 4/2000 | Clack et al. | |
| 6,139,738 A | 10/2000 | Maxwell | |
| 6,303,031 B1 | 10/2001 | Senner | |
| 6,355,177 B2 | 3/2002 | Senner et al. | |
| 6,533,926 B2 | 3/2003 | Hawkins et al. | |
| 6,537,444 B2 | 3/2003 | Wilberscheid et al. | |
| 6,551,503 B2 | 4/2003 | Niers et al. | |
| 6,753,783 B2 | 6/2004 | Friedman et al. | |
| 6,865,941 B2 * | 3/2005 | Gibbs | G01M 3/18 340/605 |
| 6,950,032 B1 * | 9/2005 | Hewitt | D06F 39/081 137/312 |
| 7,067,054 B2 | 6/2006 | Fritze | |
| RE39,361 E | 10/2006 | Den Dekker | |
| 7,481,917 B2 | 1/2009 | Ikeyama et al. | |
| 7,638,042 B2 | 12/2009 | Astle et al. | |
| 7,736,495 B2 | 6/2010 | Ikeyama et al. | |
| 7,836,708 B2 | 11/2010 | Krause et al. | |
| 8,118,997 B2 | 2/2012 | Ebrom et al. | |
| 8,196,809 B2 | 6/2012 | Thorstensson | |
| 8,216,463 B1 | 7/2012 | Baird | |
| 8,242,893 B1 * | 8/2012 | Lin | C02F 1/001 340/10.42 |
| 8,282,820 B2 | 10/2012 | Cur et al. | |
| 8,289,173 B2 | 10/2012 | Ben-Mansour et al. | |
| 8,695,371 B2 | 4/2014 | Boarman et al. | |
| 8,746,003 B2 | 6/2014 | Yoon | |
| 9,046,299 B2 | 6/2015 | An et al. | |
| 2002/0189983 A1 | 12/2002 | Guess et al. | |
| 2004/0001991 A1 | 1/2004 | Kinkelaar et al. | |
| 2004/0007516 A1 | 1/2004 | Fritze et al. | |
| 2004/0251210 A1 | 12/2004 | Fritze et al. | |
| 2005/0092070 A1 | 5/2005 | Bhatti | |
| 2005/0167352 A1 | 8/2005 | Burrows et al. | |
| 2005/0194317 A1 | 9/2005 | Ikeyama et al. | |
| 2006/0011523 A1 | 1/2006 | Schrott et al. | |
| 2006/0060512 A1 | 3/2006 | Astle et al. | |
| 2006/0186031 A1 | 8/2006 | Fick et al. | |
| 2008/0055112 A1 | 3/2008 | McGinty et al. | |
| 2010/0100026 A1 | 4/2010 | Morris | |
| 2010/0275633 A1 | 11/2010 | An et al. | |
| 2011/0036109 A1 | 2/2011 | Krause et al. | |
| 2011/0062060 A1 | 3/2011 | Royal et al. | |
| 2011/0306782 A1 | 12/2011 | DiLeo | |
| 2012/0130330 A1 * | 5/2012 | Wilson | A61F 13/42 604/361 |
| 2012/0297817 A1 | 11/2012 | Krause et al. | |
| 2013/0008838 A1 | 1/2013 | Burke et al. | |
| 2013/0068673 A1 | 3/2013 | Maggiore et al. | |
| 2013/0240431 A1 | 9/2013 | Foix et al. | |
| 2014/0110331 A1 | 4/2014 | Baird | |
| 2014/0200538 A1 * | 7/2014 | Euliano | A61F 13/42 604/361 |
| 2014/0305930 A1 | 10/2014 | Heizer et al. | |
| 2014/0353235 A1 | 12/2014 | Sherman et al. | |
| 2015/0102931 A1 | 4/2015 | Chernov et al. | |
| 2015/0290567 A1 | 10/2015 | Chernov et al. | |
| 2015/0290568 A1 * | 10/2015 | Chernov | B01D 35/143 210/85 |
| 2015/0290569 A1 * | 10/2015 | Chernov | B01D 35/143 210/85 |

FOREIGN PATENT DOCUMENTS

| | | | |
|---|---|---|---|
| JP | 2003192096 A | | 7/2003 |
| JP | 2006258684 | * | 9/2006 |
| JP | 2007147356 A | | 6/2007 |
| JP | 2007163255 | | 6/2007 |
| KR | 20120120844 A | | 11/2012 |
| WO | WO 83/02523 A1 | | 7/1983 |
| WO | WO 97/38272 A1 | | 10/1997 |
| WO | WO 03/011426 A1 | | 2/2003 |
| WO | WO 03/084875 A1 | | 10/2003 |
| WO | WO 2004/037383 A1 | | 5/2004 |
| WO | WO 2008/125530 A1 | | 10/2008 |

OTHER PUBLICATIONS

PCT Search Report and Written Opinion PCT/US2014/056282, dated Nov. 27, 2014. (11 pages).

PCT Search Report and Written Opinion PCT/US2014/060223, dated Jan. 23, 2015. (9 pages).

* cited by examiner

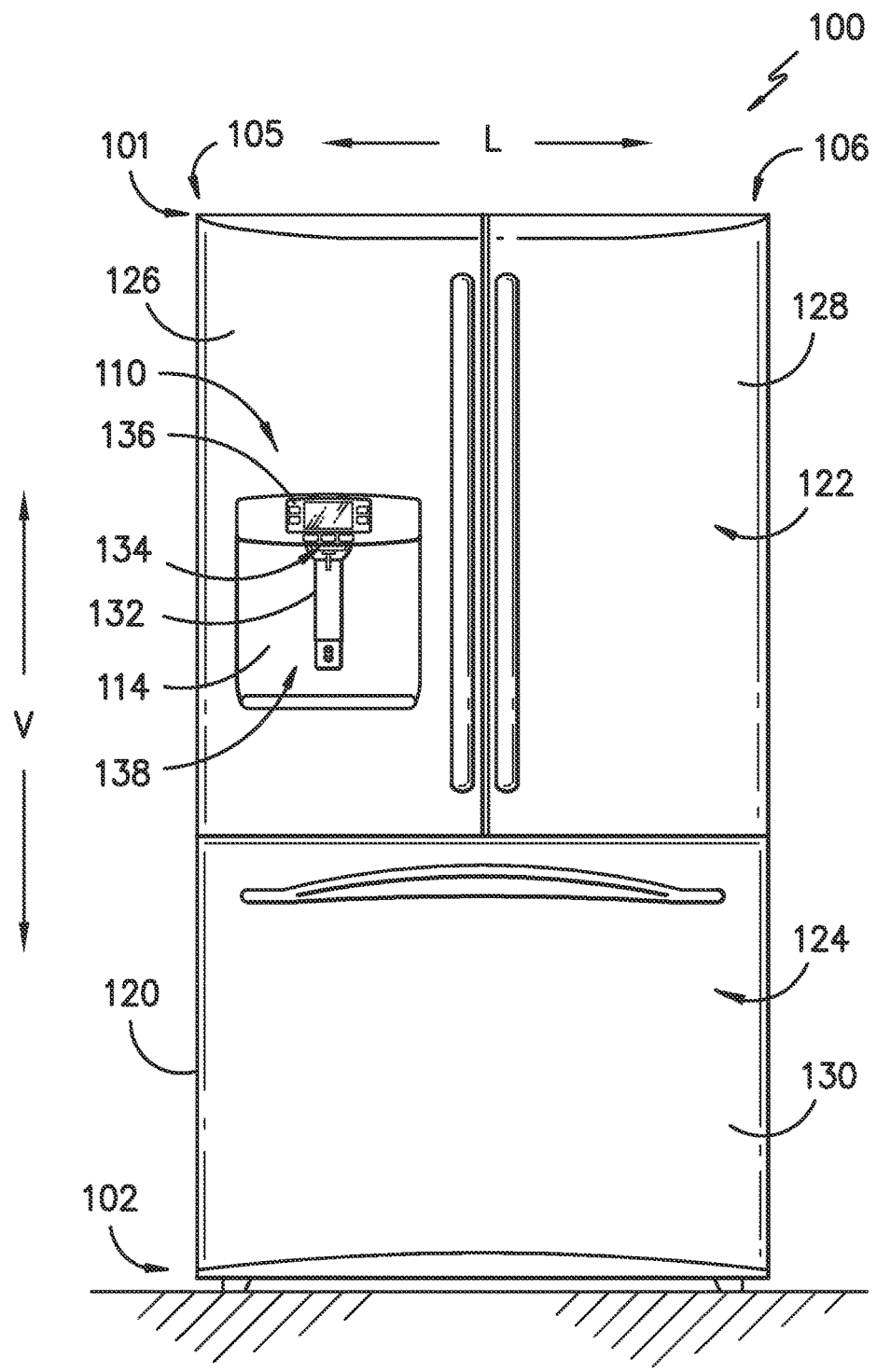
FIG. -1-

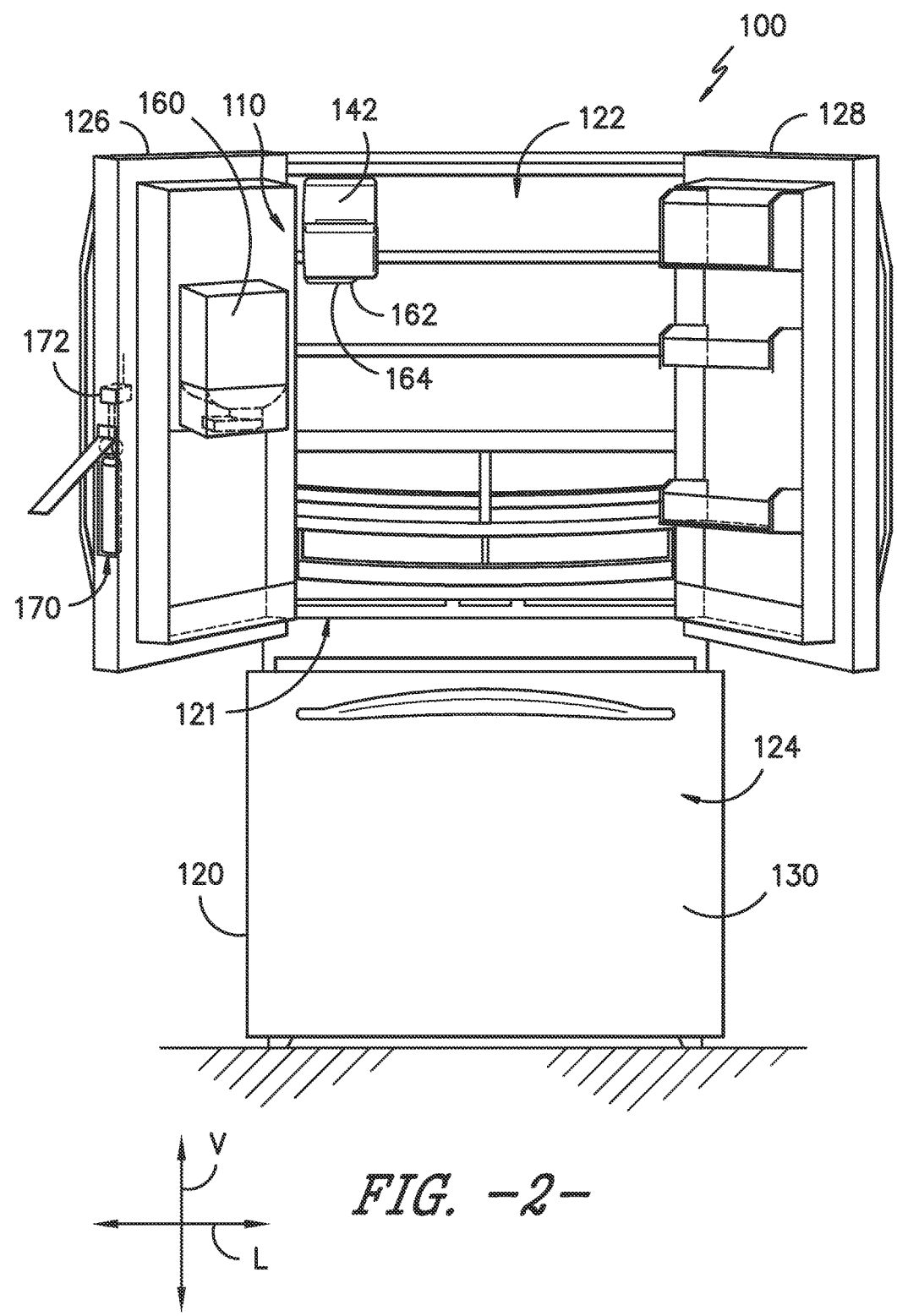
FIG. -2-

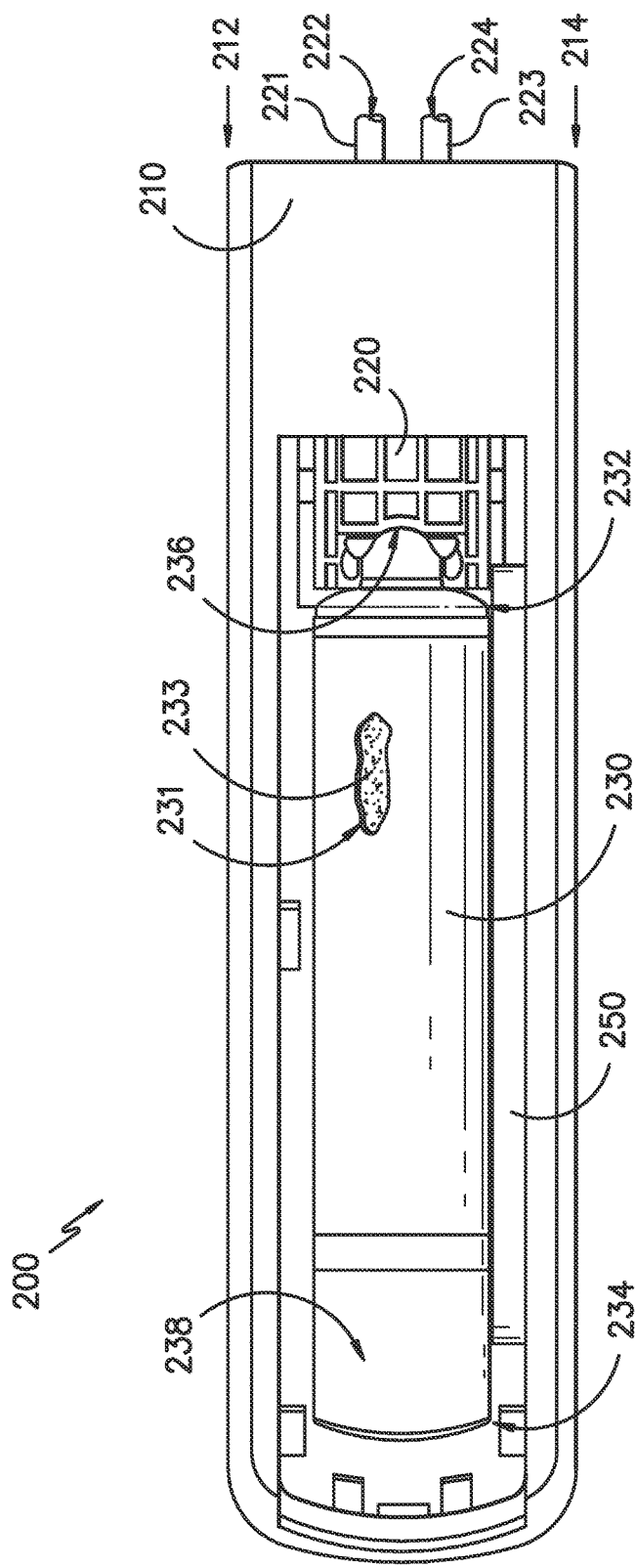
FIG. -3-

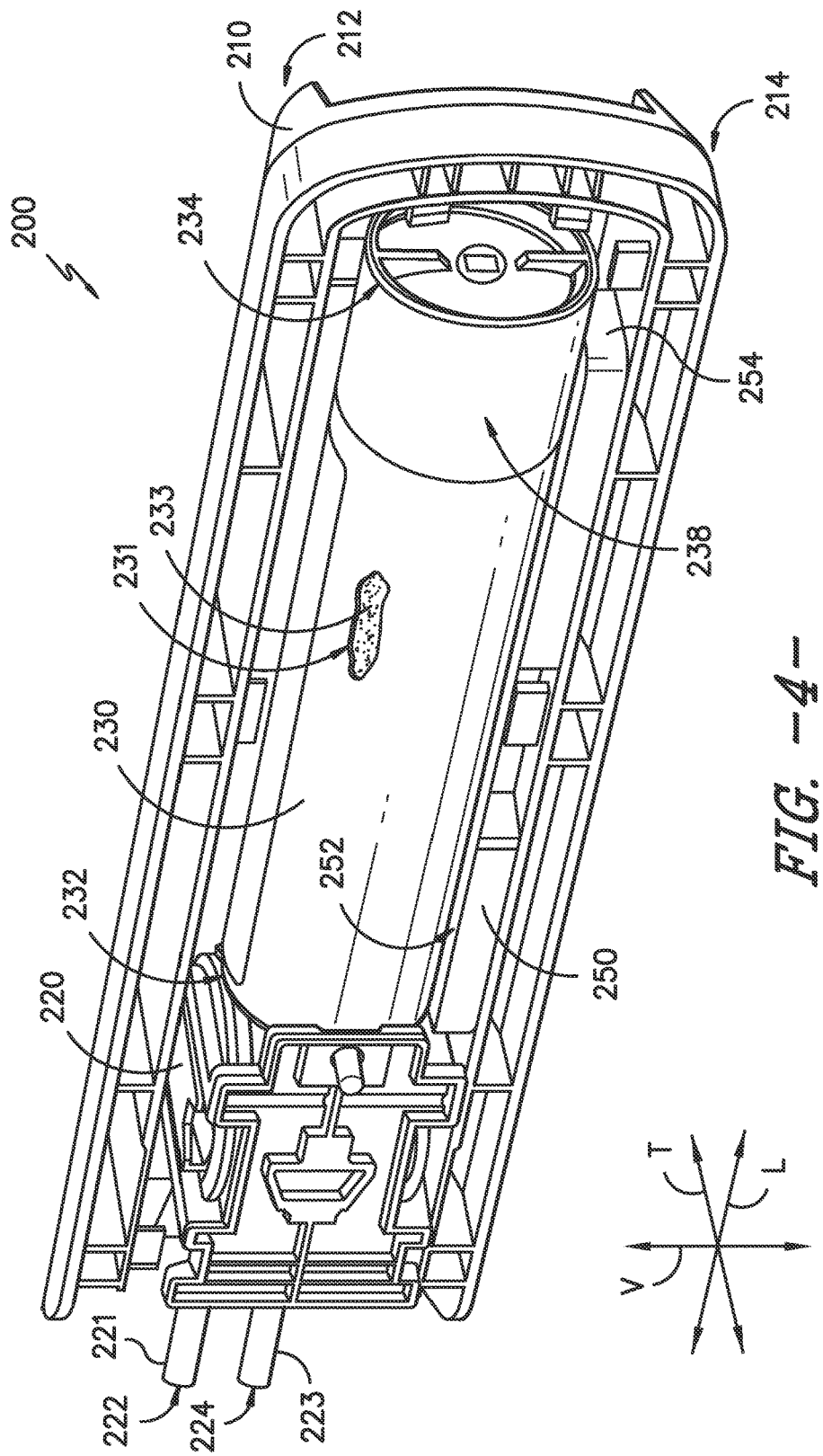
FIG. -4-

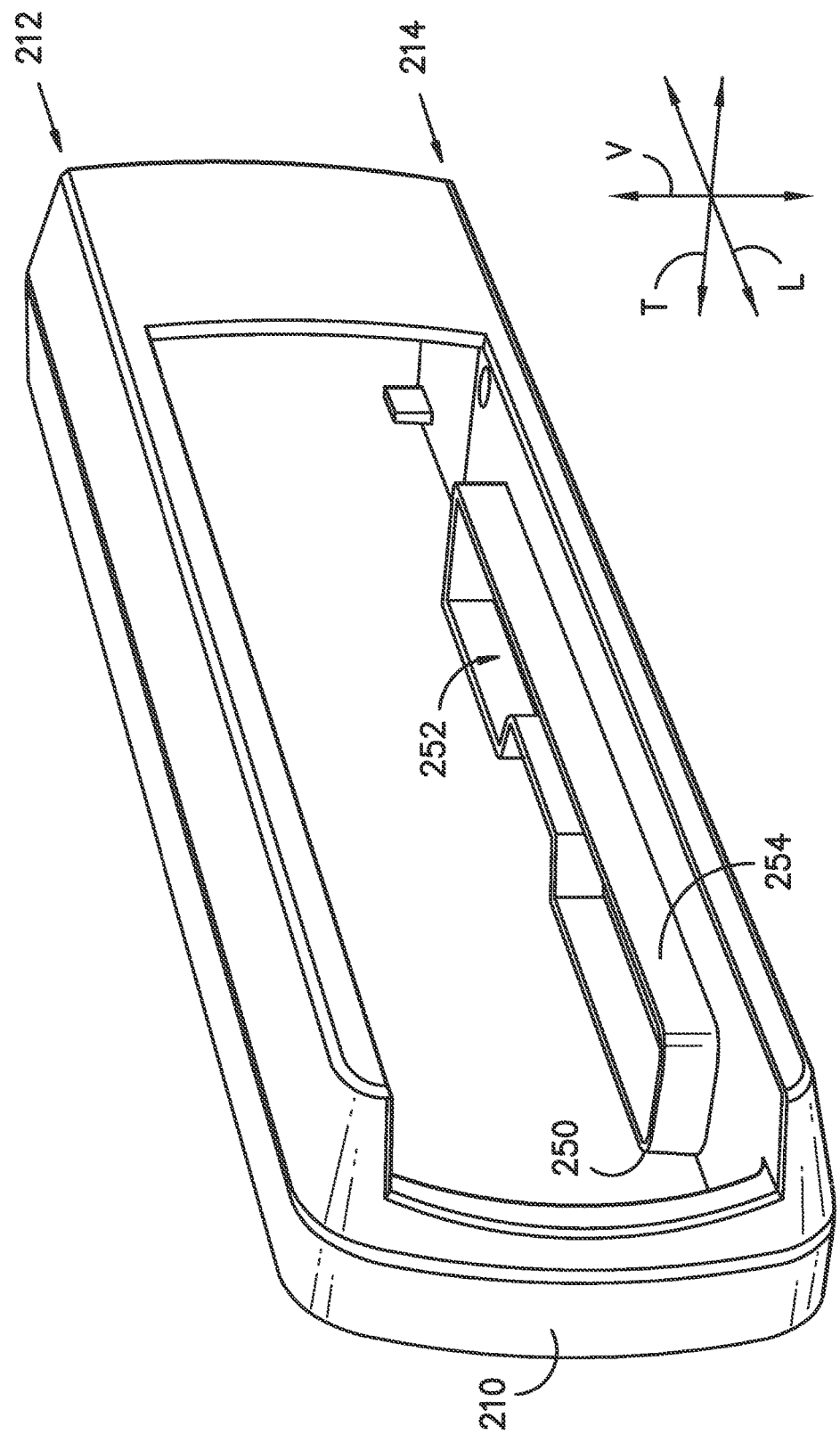
FIG. -5-

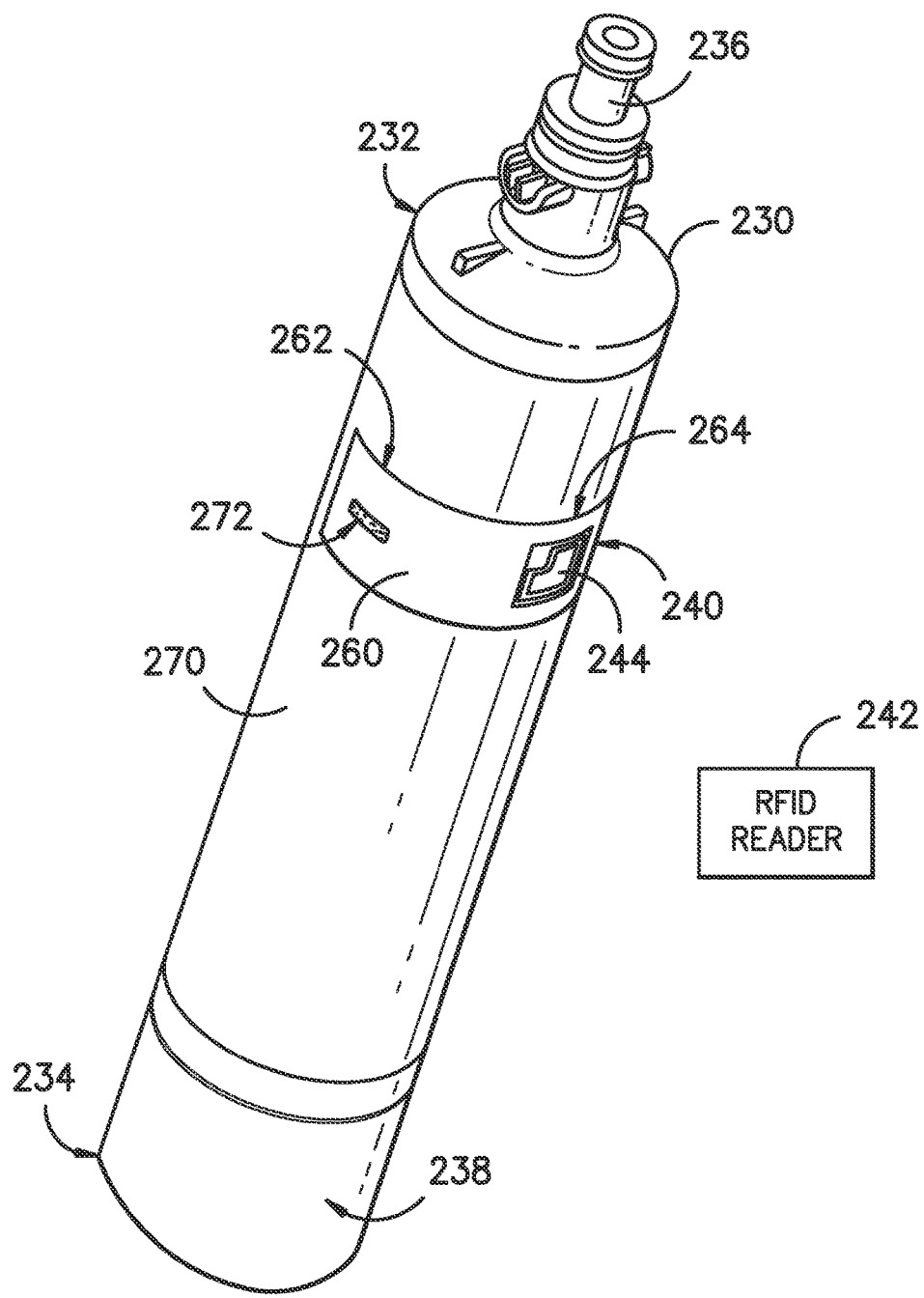
FIG. -6-

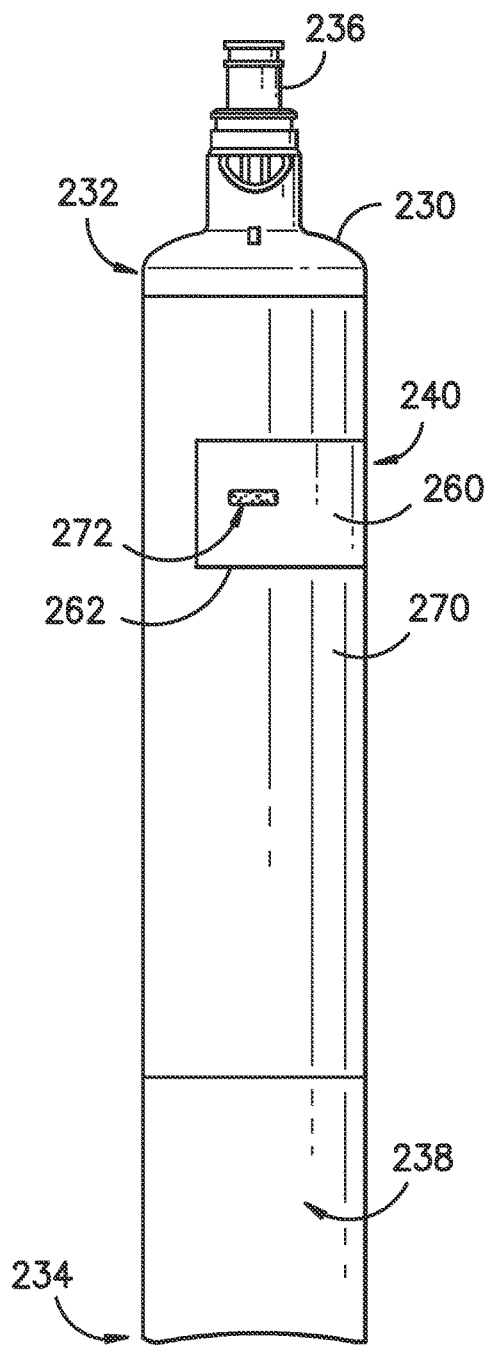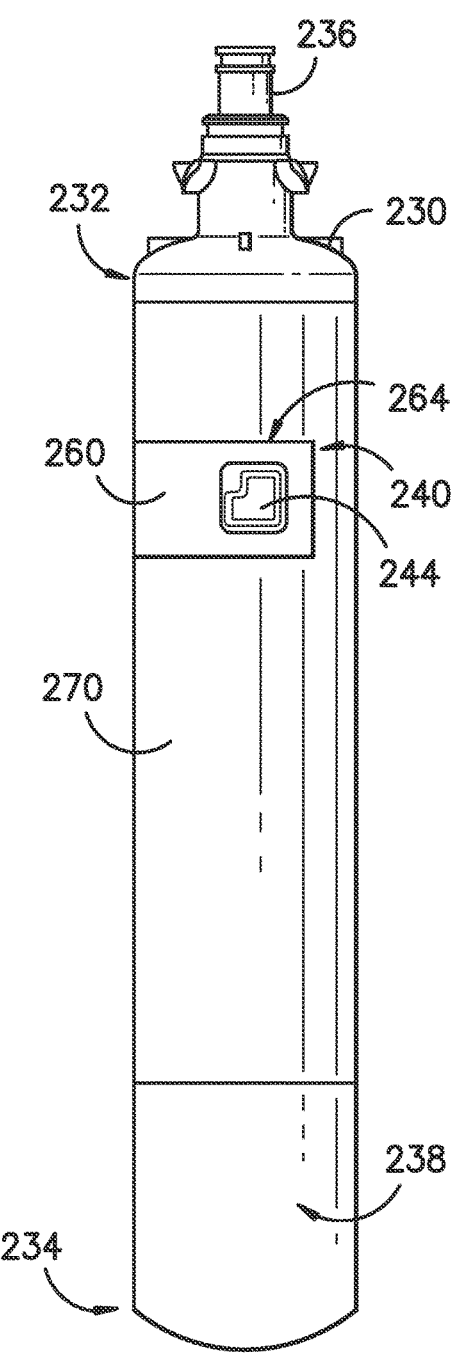
FIG. -7-     FIG. -8-

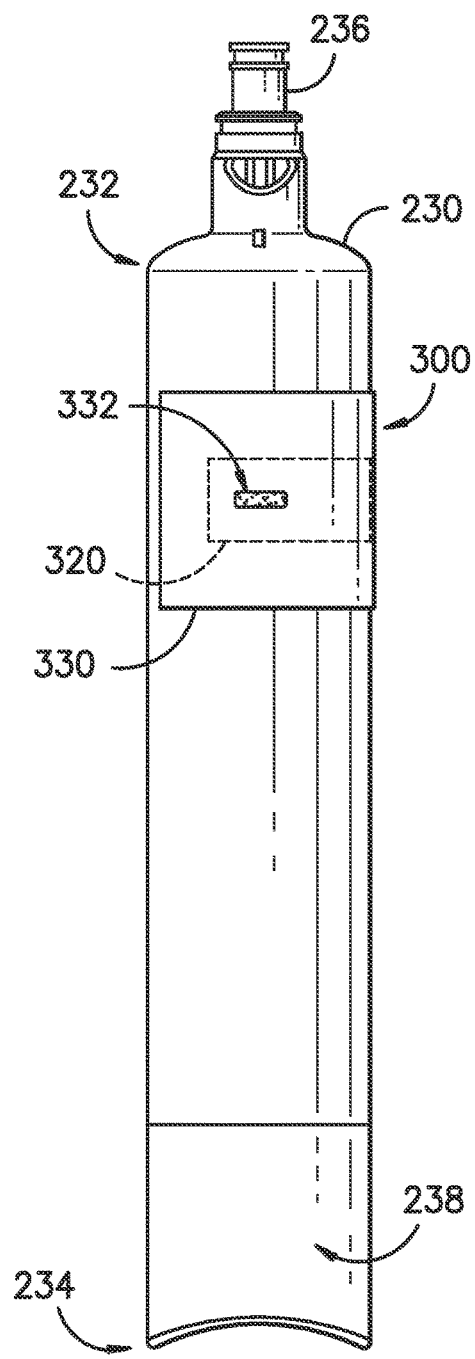
FIG. -9-
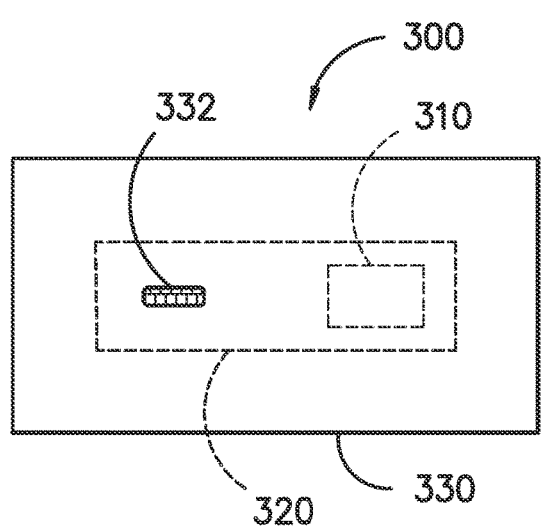
FIG. -10-

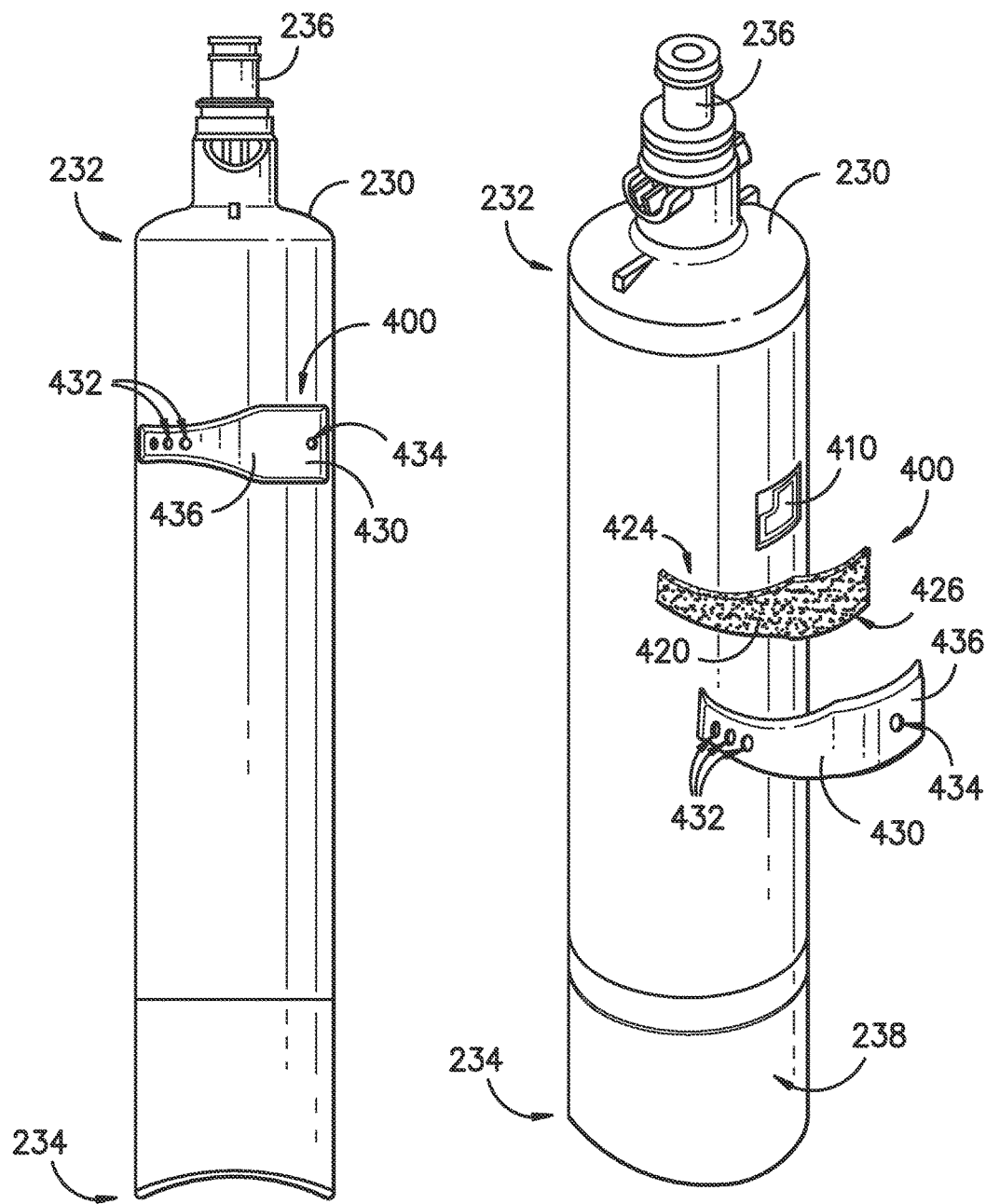
FIG. -11-   FIG. -12-

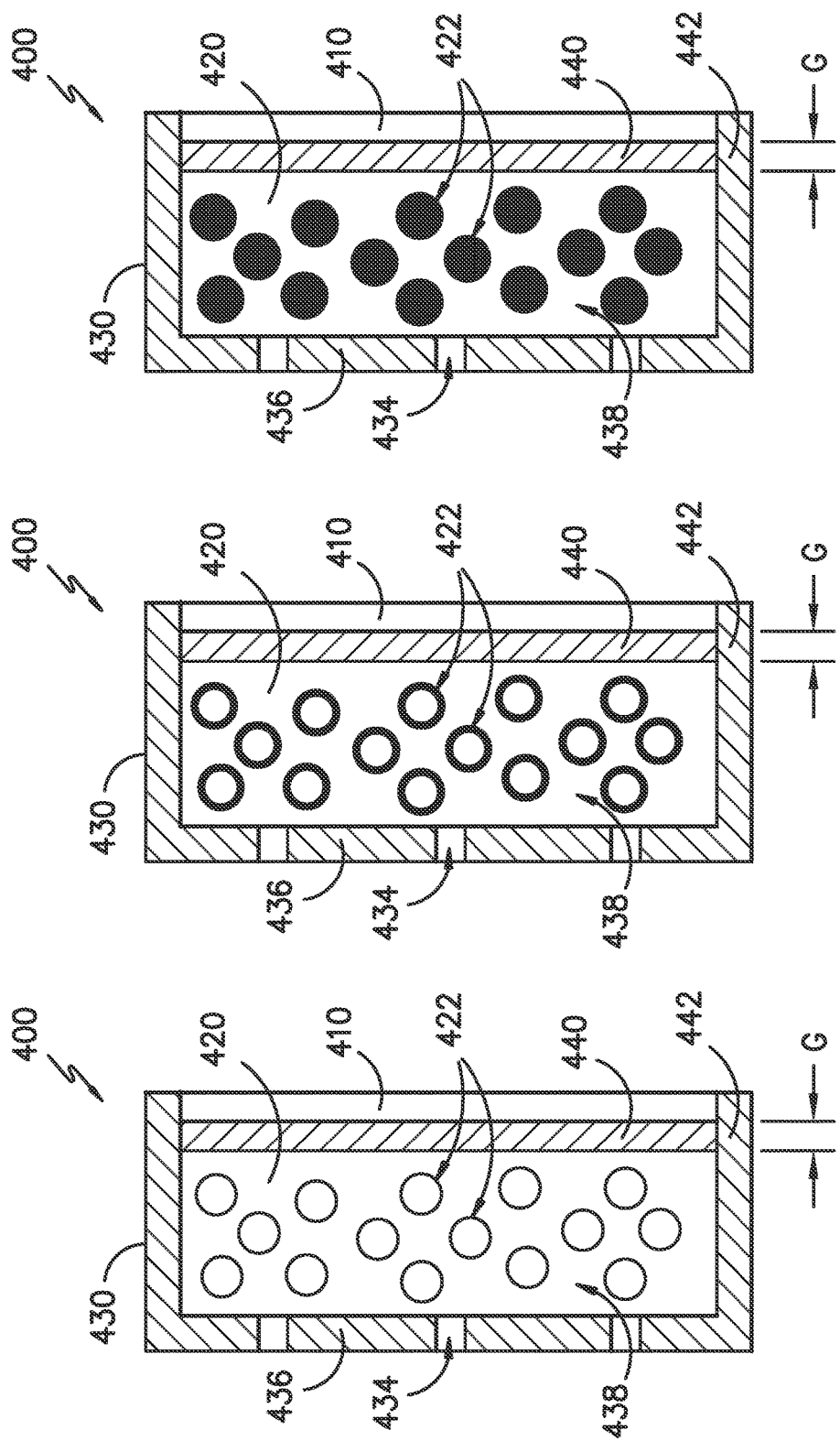

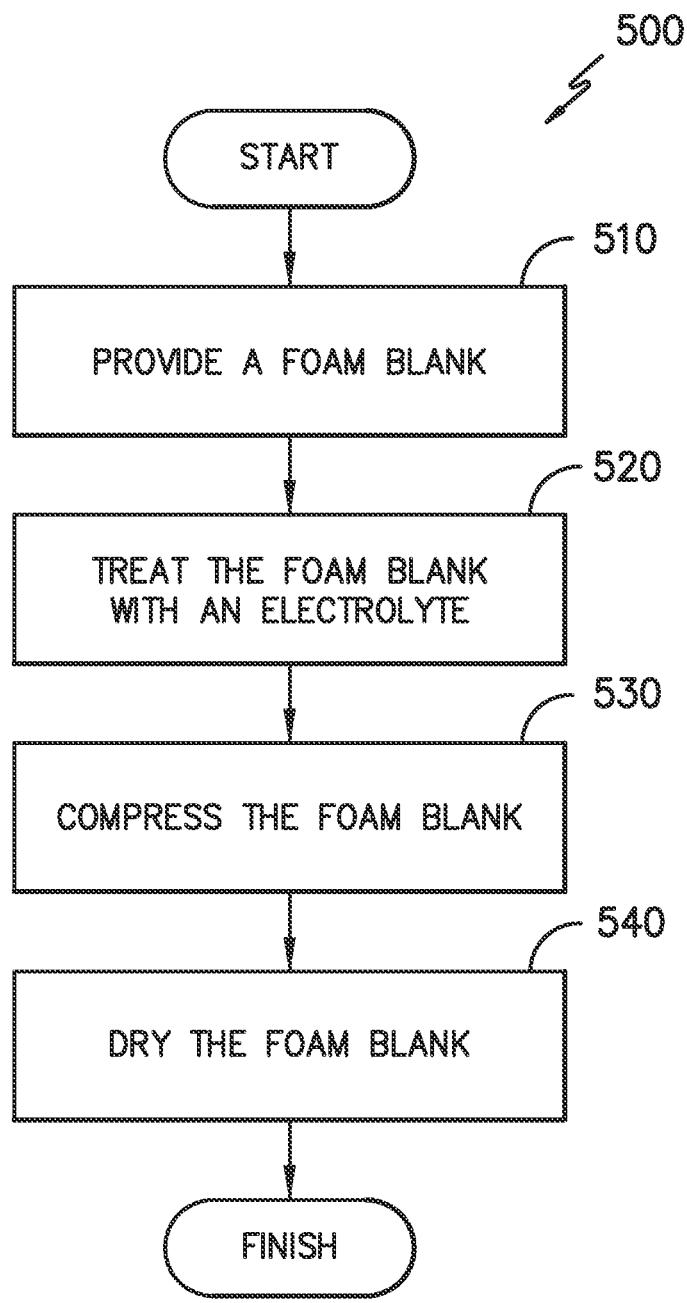
FIG. -16- ns a liquid, such as liquid water. The system includes an RFID tag and an absorbent material positioned over the RFID tag. The system also includes features for hindering or preventing compression of the absorbent material. A water filter assembly with features for detecting water leaks is also provided. Additional aspects and advantages of the invention will be set forth in part in the following description, or may be apparent from the description, or may be learned through practice of the invention.

SYSTEM FOR DETECTING A LIQUID AND A WATER FILTER ASSEMBLY

FIELD OF THE INVENTION

The present subject matter relates generally to RFID systems.

BACKGROUND OF THE INVENTION

Certain water filter assemblies include a manifold and a filter cartridge. The manifold directs unfiltered water into the filter cartridge and filtered water out of the filter cartridge. The filter cartridge includes a filter medium, such as an activated carbon block, a pleated polymer sheet, a spun cord material, or a melt blown material. The filter medium is positioned within the filter cartridge and filters water passing therethrough.

Over time, the filter medium will lose effectiveness. For example, pores of the filter medium can become clogged or the filter medium can become saturated with contaminants. To insure that the filtering medium has not exceeded its filtering capacity, the filtering medium is preferably replaced or serviced at regular intervals regardless of its current performance. To permit replacement or servicing of the filter medium or the filter cartridge, the filter cartridge is generally removably mounted to the manifold.

Water leaks can form or develop at an interface or connection between the filter cartridge and the manifold, such as where the filter cartridge mounts to the manifold. As an example, such leaks can develop if the water filter assembly is installed incorrectly or is exposed to relatively high water pressures or freezing conditions. Such leaks can negatively affect operation of the water filter assembly and/or the refrigerator appliance and can cause damage if not prevented. Such leaks can also be difficult to detect. In particular, water filter assemblies are often positioned in relatively remote locations within refrigerator appliances such that visually monitoring the water filter assemblies for leaks can be difficult or infrequent. Similar problems can make detecting liquid water and water leaks difficult in other circumstances and locations as well.

Accordingly, a system or method for detecting liquid, such as liquid water, would be useful. In particular, a system or method for detecting liquid water with features for limiting or preventing unnecessarily triggers under damp conditions would be useful.

BRIEF DESCRIPTION OF THE INVENTION

The present subject matter provides a system for detecting a liquid, such as liquid water. The system includes an RFID tag and an absorbent material positioned over the RFID tag. The system also includes features for hindering or preventing compression of the absorbent material. A water filter assembly with features for detecting water leaks is also provided. Additional aspects and advantages of the invention will be set forth in part in the following description, or may be apparent from the description, or may be learned through practice of the invention.

In a first exemplary embodiment, a system for detecting liquid water is provided. The system includes an RFID tag and an absorbent material positioned over the RFID tag. A rigid casing is also positioned over the absorbent material and the RFID tag.

In a second exemplary embodiment, a water filter assembly is provided. The water filter assembly includes a filter cartridge with a filter medium disposed therein. The filter cartridge also has an outer surface. An RFID tag is positioned at the outer surface of the filter cartridge. An absorbent material is positioned over the RFID tag. A rigid casing is mounted to the filter cartridge at the outer surface of the filter cartridge. The rigid casing is positioned over the absorbent material and the RFID tag.

In a third exemplary embodiment, a system for detecting liquid is provided. The system includes an RFID tag and an absorbent material positioned over the RFID tag. The system also includes means for spacing the absorbent material from the RFID tag.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front, elevation view of a refrigerator appliance according to an exemplary embodiment of the present subject matter with refrigerator doors of the exemplary refrigerator appliance shown in a closed position.

FIG. 2 provides a front, elevation view of the exemplary refrigerator appliance of FIG. 1 with refrigerator doors of the exemplary refrigerator appliance shown in an open position.

FIG. 3 provides a front, elevation view of a water filter assembly according to an exemplary embodiment of the present subject matter.

FIG. 4 provides a rear, perspective view of the exemplary water filter assembly of FIG. 3.

FIG. 5 provides a front, perspective view of a casing of the exemplary water filter assembly of FIG. 3.

FIG. 6 provides a perspective view of a filter cartridge of the exemplary water filter assembly of FIG. 3.

FIGS. 7 and 8 provide elevation views of the filter cartridge of FIG. 6.

FIG. 9 provides an elevation view of a system for detecting liquid water according to an exemplary embodiment of the present subject matter.

FIG. 10 provides a plan view of certain components of the exemplary system for detecting liquid water of FIG. 9.

FIG. 11 provides an elevation view of a system for detecting liquid water according to another exemplary embodiment of the present subject matter.

FIG. 12 provides an exploded view of the exemplary system for detecting liquid water of FIG. 11.

FIGS. 13, 14 and 15 provide schematic views of certain components of the exemplary system for detecting liquid water of FIG. 11.

FIG. 16 illustrates a method for treating foam according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a refrigerator appliance 100 according to an exemplary embodiment of the present subject matter. FIG. 2 provides a front, elevation view of refrigerator appliance 100 with refrigerator doors 126 and 128 of refrigerator appliance 100 shown in an open position to reveal a fresh food chamber 122 of refrigerator appliance 100. Refrigerator appliance 100 defines a vertical direction V, a transverse direction T (FIG. 3), and a lateral direction L. The vertical direction V, transverse direction T, and lateral direction L are mutually perpendicular and form an orthogonal direction system. Refrigerator appliance 100 extends between an upper portion 101 and a lower portion 102 along the vertical direction V. Refrigerator appliance 100 also extends between a first side portion 105 and a second side portion 106 along the lateral direction L.

Refrigerator appliance 100 includes a cabinet 120 that defines chilled chambers for receipt of food items for storage. In particular, refrigerator appliance 100 defines fresh food chamber 122 at upper portion 101 of refrigerator appliance 100 and a freezer chamber 124 arranged below fresh food chamber 122 on the vertical direction V, e.g., at lower portion 102 of refrigerator appliance 100. As such, refrigerator appliance 100 is generally referred to as a bottom mount refrigerator appliance. However, using the teachings disclosed herein, one of skill in the art will understand that the present subject matter may be used with other types of refrigerator appliances (e.g., side-by-side style or top mount style) or a freezer appliance as well. Consequently, the description set forth herein is for illustrative purposes only and is not intended to limit the present subject matter to any particular chilled chamber arrangement.

Refrigerator doors 126 and 128 are rotatably hinged to an edge of cabinet 120 for accessing fresh food chamber 122. In particular, cabinet 120 defines an opening 121. Opening 121 of cabinet 120 permits access to fresh food chamber 122 of cabinet 120. Refrigerator doors 126 and 128 are positioned at opening 121 of cabinet 120 and permit selective access to fresh food chamber 122 of cabinet 120 through opening 121 of cabinet 120, e.g., by rotating between the open and closed positions. A freezer door 130 is arranged below refrigerator doors 126 and 128 for accessing freezer chamber 124. Freezer door 130 is coupled to a freezer drawer (not shown) slidably mounted within freezer chamber 124.

Refrigerator appliance 100 also includes a dispensing assembly 110 for dispensing water and/or ice. Dispensing assembly 110 includes a dispenser 114 positioned on or mounted to an exterior portion of refrigerator appliance 100, e.g., on refrigerator door 126. Dispenser 114 includes a discharging outlet 134 for accessing ice and water. A sensor 132, such as an ultrasonic sensor, is mounted below discharging outlet 134 for operating dispenser 114. In alternative exemplary embodiments, any suitable actuator may be used to operate dispenser 114. For example, dispenser 114 can include a paddle or button rather than sensor 132. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and sensor 132 are an external part of dispenser 114 and are mounted in a dispenser recess 138 defined in an outside surface of refrigerator door 126. Dispenser recess 138 is positioned at a predetermined elevation convenient for a user to access ice or water and enabling the user to access ice without the need to bend-over and without the need to access freezer chamber 124. In the exemplary embodiment, dispenser recess 138 is positioned at a level that approximates the chest level of a user.

Turning now to FIG. 2, certain components of dispensing assembly 110 are illustrated. Dispensing assembly 110 includes an insulated housing 142 mounted within fresh food chamber 122. Due to the insulation which encloses insulated housing 142, the temperature within insulated housing 142 can be maintained at levels different from the ambient temperature in the surrounding fresh food chamber 122.

Insulated housing 142 is constructed and arranged to operate at a temperature that facilitates producing and storing ice. More particularly, insulated housing 142 contains an ice maker (not shown) for creating ice and feeding the same to a container 160 that is mounted on refrigerator door 126. As illustrated in FIG. 2, container 160 is placed at a vertical position on refrigerator door 126 that will allow for the receipt of ice from a discharge opening 162 located along a bottom edge 164 of insulated housing 142. As refrigerator door 126 is closed or opened, container 160 is moved in and out of position under insulated housing 142.

Refrigerator appliance 100 also includes a water filter assembly 170. Water filter assembly 170 can filter water from a water supply (not shown), such as a municipal water source or a well. Water filter assembly 170 can remove contaminants and other undesirable substances from water passing therethrough. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water filter assembly 170 is mounted to cabinet 120. In particular, water filter assembly 170 is mounted to refrigerator door 126 in the exemplary embodiment shown in FIG. 2. However, it should be understood that water filter assembly 170 can be positioned at any other suitable location within refrigerator appliance 100 in alternative exemplary embodiments. For example, water filter assembly 170 may be mounted to refrigerator door 128, to cabinet 120 within fresh food chamber 122, or to cabinet 120 below freezer chamber 124 in alternative exemplary embodiments. Thus, the position of water filter assembly 170 shown in FIG. 2 is not intended to limit the present subject matter in any aspect and is provided by way of example only.

Refrigerator appliance 100 also includes a valve 172 as schematically shown in FIG. 2. Valve 172 is configured for regulating a flow of water to water filter assembly 170. In particular, valve 172 can selectively shift between a closed position and an open position. Valve 172 permits the flow of water to water filter assembly 170 in the open position. Thus, with valve 172 in the open position, water for filtering is supplied to water filter assembly 170. Conversely, valve 172 obstructs or blocks the flow of water to water filter assembly 170 in the closed position. Thus, with valve 172 in the closed position, water for filtering is not supplied to water filter assembly 170 or is supplied to water filter assembly 170 in an insubstantial volume. In such a manner, valve 172 can regulate the flow of water to water filter assembly 170 by shifting between the open and closed positions.

FIG. 3 provides a front elevation view of a water filter assembly 200 according to an exemplary embodiment of the present subject matter. FIG. 4 provides a rear perspective view of water filter assembly 200. Water filter assembly 200 can be used in any suitable appliance. For example, water filter assembly 200 may be used in refrigerator appliance 100 (FIG. 2) as water filter assembly 170 (FIG. 2). As discussed in greater detail below, water filter assembly 200 is configured for filtering water passing therethrough. In such a manner, water filter assembly 200 can provide filtered water to various components of refrigerator appliance 100, such as dispensing assembly 110 or the ice maker (not shown) within insulated housing 142. Water filter assembly 200 may also be used to filter water at any other suitable location. For example, water filter assembly 200 may be utilized as a point-of-entry water filter for a building or residence. As another example, water filter assembly 200 may be utilized as a point-of-use water filter for a faucet, a water fountain, etc.

As may be seen in FIG. 3, water filter assembly 200 includes a housing or casing 210. Casing 210 extends between a top portion 212 and a bottom portion 214, e.g., along the vertical direction V. As an example, casing 210 can be mounted to any suitable portion of refrigerator appliance 100 in order to mount water filter assembly 200 to refrigerator appliance 100. For example, casing 210 may be mounted to refrigerator door 126 or cabinet 120. In particular, casing 210 may be encased within or engage insulating foam (not shown) of cabinet 120 to mount water filter assembly 200 to refrigerator appliance 100. As another example, casing 210 may be mounted to a wall of building or residence, e.g., when water filter assembly 200 is utilized as a point-of-entry water filter.

Water filter assembly 200 also includes a manifold 220. Manifold 220 is mounted to casing 210. Manifold 220 is configured for receiving unfiltered water and directing filtered water out of water filter assembly 200. In particular, manifold 220 includes an inlet conduit 221 that defines an inlet 222. Inlet 222 receives unfiltered water, e.g., from a water source (not shown) such as a municipal water supply or a well. Manifold 220 also includes an outlet conduit 223 that defines an outlet 224. Outlet 224 directs filtered water out of water filter assembly 200. Thus, manifold 220 receives unfiltered water at inlet 222. Such unfiltered water passes through water filter assembly 200 and exits manifold 220 at outlet 224 as filtered water.

As shown in FIG. 3, water filter assembly 200 includes a filter canister or filter cartridge 230 for filtering unfiltered water received at inlet 222 of manifold 220. Thus, filter cartridge 230 filters water passing through water filter assembly 200. Filter cartridge 230 extends between a first end portion 232 and a second end portion 234, e.g., along the lateral direction L. A connection 236 of filter cartridge 230 is positioned at or proximate first end portion 232 of filter cartridge 230. Connection 236 of filter cartridge 230 is configured for engaging manifold 220, e.g., in order to removably mount filter cartridge 230 to manifold 220.

Connection 236 of filter cartridge 230 also places filter cartridge 230 in fluid communication with manifold 220 when filter cartridge 230 is mounted to manifold 220. Thus, filter cartridge 230 can receive unfiltered water from inlet 222 of manifold 220 at connection 236 and direct such unfiltered water into a chamber 231 when filter cartridge 230 is mounted to manifold 220. Water within chamber 231 can pass through a filtering medium 233 positioned within chamber 231 and can exit chamber 231 as filtered water. In particular, connection 236 of filter cartridge 230 can direct filtered water out of chamber 231 to outlet 224 of manifold 220 when filter cartridge 230 is mounted to manifold 220. In such a manner, filtering medium 233 of filter cartridge 230 can filter a flow of water through water filter assembly 200. Such filtering can improve taste and/or safety of water.

Filtering medium 233 can include any suitable mechanism for filtering water within water filter assembly 200. For example, filtering medium 233 may include an activated carbon block, a reverse osmosis membrane, a pleated polymer or cellulose sheet, or a melt blown or spun cord medium. As used herein, the term "unfiltered" describes water that is not filtered relative to filtering medium 233. However, as will be understood by those skilled in the art, water filter assembly 200 may include additional filters that filter water entering chamber 231. Thus, "unfiltered" may be filtered relative to other filters but not filtering medium 233.

As will be understood by those skilled in the art, filtering medium 233 of filter cartridge 230 can lose efficacy over time. Thus, a user can replace filter cartridge and/or filtering medium 233 of filter cartridge 230 at regular intervals or after a certain volume of water has passed through filter cartridge 230. To replace filter cartridge 230 and/or filtering medium 233 of filter cartridge 230, the user can remove or disconnect filter cartridge 230 from manifold 220 and insert or mount a new filter cartridge 230 or filtering medium 233 of filter cartridge 230.

Water filter assembly 200 can be exposed to a variety of conditions within that can negatively affect performance of water filter assembly 200. For example, high water pressure at inlet 222 of manifold 220 and/or connection 236 of filter cartridge 230 or exposing water filter assembly 200 to freezing conditions can negatively affect performance of water filter assembly 200. Such conditions can cause water filter assembly 200 to leak, e.g., at connection 236 of filter cartridge 230. Such conditions can also cause water filter assembly 200 to deform or crack. As discussed in greater detail below, water filter assembly 200 includes features for detecting such malfunctions of water filter assembly 200.

FIG. 6 provides a perspective view of filter cartridge 230 of water filter assembly 200. FIGS. 7 and 8 provide elevation views of filter cartridge 230. As may be seen in FIGS. 6, 7 and 8, water filter assembly 200 includes a system 240 for detecting liquid water. It should be understood that system 240 can be used to detect liquid water and/or water leaks in any other suitable setup or arrangement in alternative exemplary embodiments. Thus, while described in the context of water filter assembly 200, system 240 may be used to detect water leaks from any suitable container, vessel, pipe or conduit or to detect liquid water in the container, vessel, pipe or conduit or on the surface in alternative exemplary embodiments.

As may be seen in FIG. 6, system 240 includes a radio frequency identification reader or RFID reader 242 (shown schematically). System 240 also includes a radio frequency identification tag or RFID tag 244. RFID reader 242 is configured for receiving a signal from RFID tag 244. Thus, RFID reader 242 and RFID tag 244 can be in signal communication with each other as will be understood by those skilled in the art. For example, RFID reader 242 and RFID tag 244 may be in signal communication with each other as described in U.S. patent application Ser. No. 14/052, 847 entitled "A Refrigerator Appliance and A Method For Monitoring A Water Filter Assembly Within The Same" and/or U.S. patent application Ser. No. 14/052,837 entitled "A System And A Method For Detecting Liquid Water," both of which are incorporated by reference herein in their entireties.

In certain exemplary embodiments, RFID tag 244 is a passive RFID tag. Thus, RFID reader 242 can receive a radio signal from RFID tag 244 in response to a query or request signal from RFID reader 242. In particular, RFID tag 244 can generate or transmit the response radio signal utilizing energy transmitted, e.g., wirelessly, to RFID tag 244 from RFID reader 242 via the query or request signal from RFID reader 242. Thus, RFID tag 244 need not include a battery or other power source in order to generate or transmit the response radio signal. In other exemplary embodiments, RFID tag 244 is an active RFID tag and includes a battery or is connected to a suitable power source. Thus, RFID tag 244 can continuously or intermittently generate or transmit a signal that RFID reader 242 can receive. As will be understood by those skilled in the art, RFID reader 242 and RFID tag 244 can have any other suitable setup or configuration for placing RFID reader 242 and RFID tag 244 in signal communication with each other. Thus, RFID reader 242 may be passive or active, and RFID tag 244 may be passive or active depending upon the desired setup of system 240.

As will be understood by those skilled in the art, signal communication between RFID reader 242 and RFID tag 244 is affected by a variety of factors. For example, signal communication between RFID reader 242 and RFID tag 244 can be limited or terminated if a gap between RFID reader 242 and RFID tag 244 is increased. RFID reader 242 and RFID tag 244 can also be tuned such that signal communication between RFID reader 242 and RFID tag 244 is established with a particular transmission medium, such as air, disposed between RFID reader 242 and RFID tag 244, e.g., within the gap between RFID reader 242 and RFID tag 244. Thus, the signal communication between RFID reader 242 and RFID tag 244 can be disrupted or terminated if the transmission medium changes and another material is positioned between RFID reader 242 and RFID tag 244. For example, if water is positioned between RFID reader 242 and RFID tag 244, the signal communication between RFID reader 242 and RFID tag 244 can be terminated or disrupted. In particular, liquid water can absorb radio waves and thereby terminate or disrupt signal communication between RFID reader 242 and RFID tag 244. Liquid water can also affect transmission and reception of radio waves by antennas of RFID reader 242 and/or RFID tag 244. As discussed in greater detail below, when signal communication between RFID reader 242 and RFID tag 244 is disrupted, lost or terminated, it can be inferred that liquid water is disposed between RFID reader 242 and RFID tag 244 (e.g., that liquid water is disposed within the gap between RFID reader 242 and RFID tag 244). For example, when signal communication between RFID reader 242 and RFID tag 244 is interrupted, it can be inferred that water filter assembly 200 is leaking or otherwise malfunctioning.

It should be understood that system 240 can be used to detect liquid water and/or water leaks in any other suitable setup or arrangement. Thus, RFID tag 244 need not be mounted to filter cartridge 230 in alternative exemplary embodiments. For example, RFID tag 244 may be mounted to any other suitable container, vessel, pipe, conduit, surface, etc. In such a manner, system 240 may be used to detect water leaks from the container, vessel, pipe or conduit or to detect liquid water in the container, vessel, pipe or conduit or on the surface. In addition, system 240 may also be arranged or configured to detect any other suitable liquid in alternative exemplary embodiments.

Water filter assembly 200 also includes features for collecting water leaking from water filter assembly 200. FIG. 5 provides a front perspective view of casing 210 of water filter assembly 200. As may be seen in FIG. 5, water filter assembly 200 includes a liquid collector 250. Liquid collector 250 defines a collection volume 252. As an example, liquid collector 250 may include a side wall 254 that is mounted to casing 210 and extends away from casing 210. In particular, side wall 254 may be position at bottom portion 214 of casing 210 and may extend from casing 210 upwardly, e.g., along the vertical direction V, towards filter cartridge 230. Thus, as shown in FIG. 3, liquid collector 250 may be positioned (e.g., directly) below filter cartridge 230, e.g., along the vertical direction V. An absorptive material (not shown), such as cellulose sponge, may be positioned within collection volume 252 of liquid collector 250 in order to assist with collection water therein. In certain exemplary embodiments, side wall 254 need not be included if liquid collector 250 includes the absorptive material at collection volume 252 of liquid collector 250.

Liquid collector 250 may be mounted to casing 210, e.g., at bottom portion 214 of casing 210. In particular, liquid collector 250 may be continuous with or integrally mounted to casing 210. Thus, as an example, casing 210 and liquid collector 250 may be constructed of or with a single, continuous piece of molded plastic. In particular, side wall 254 of liquid collector 250 may be continuous with or integrally mounted to casing 210.

Liquid collector 250 is positioned for collecting liquid leaking from filter cartridge 230. As an example, liquid may leak from a crack in filter cartridge 230. Such liquid may flow on an outer surface 238 of filter cartridge 230, e.g., downwardly along the vertical direction V. By being positioned below filter cartridge 230, e.g., along the vertical direction V, such liquid may then flow into collection volume 252 of liquid collector 250 and fill or pool within collection volume 252.

Liquid collector 250 is also positioned for collecting liquid leaking from connection 236 of filter cartridge 230 and manifold 220. As an example, liquid collector 250, e.g., collection volume 252 of liquid collector 250, may be positioned (e.g., directly) below connection 236 of filter cartridge 230 and manifold 220, e.g., along the vertical direction V. Thus, liquid may leak from connection 236 of filter cartridge 230 and manifold 220 and flow into collection volume 252 of liquid collector 250 where the liquid can fill or pool within collection volume 252. As discussed in greater detail below, by collecting liquid within collection volume 252, detection of liquid leaking from water filter assembly 200 may be improved.

Turning back to FIG. 6, system 240 also include features for wicking liquid from a liquid collection location, such as collection volume 252 of liquid collector 250, to RFID tag 244. Thus, RFID tag 244 may detect liquid water and/or water leaks despite RFID tag 244 being spaced apart or remotely located from the liquid collection location. As an example, RFID tag 244 may be positioned above collection volume 252 of liquid collector 250, e.g., along the vertical direction V. As discussed above, collection volume 252 of liquid collector 250 can receive liquid leaking from filter cartridge 230 and/or connection 236 of filter cartridge 230 and manifold 220. Liquid within collection volume 252 of liquid collector 250 can be wicked upwardly to RFID tag 244 in order to disrupt or terminate the signal communication between RFID reader 242 and RFID tag 244.

As may be seen in FIG. 6, system 240 includes a hydroscopic or absorbent material 260. Absorbent material 260 extends between a first end portion 262 and a second end portion 264, e.g., along the vertical direction V. First and second end portions 262 and 264 of absorbent material 260 are spaced apart from each other, e.g., along the vertical direction V. Thus, first and second end portions 262 and 264 of absorbent material 260 may be positioned at separate locations, and absorbent material 260 may wick or otherwise transfer liquid between the first and second end portions 262 and 264 of absorbent material 260. As an example, first end portion 262 of absorbent material 260 may be positioned at a liquid collection location, such as collection volume 252 of liquid collector 250 (FIG. 5). Conversely, second end portion 264 of absorbent material 260 may be positioned at or over RFID tag 244. Thus, second end portion 264 of absorbent material 260 and RFID tag 244 may be spaced apart from the liquid collection location, and absorbent material 260 may wick or otherwise transfer liquid from the liquid collection location to the RFID tag 244. In such a manner, absorbent material 260 may assist with permitting RFID tag 244 to be positioned remotely relative to the liquid collection location, and, thereby, permit detection of liquid with system 240 at locations where RFID tag 244 cannot be directly positioned. However, it should be understood that RFID tag 244 may be positioned directly within collection volume 252 of liquid collector 250 in alternative exemplary embodiments. In addition, RFID tag 244 may be positioned at any other suitable location on outer surface 238 of filter cartridge 230 in alternative exemplary embodiments, e.g., when filter cartridge 230 is vertically oriented and liquid collector 250 is not included.

Absorbent material 260 may be any suitable absorbent material. For example, absorbent material 260 may be or include cellulose foam, paper or synthetic foam. In addition, an electrolyte may be disposed within absorbent material 260. Thus, absorbent material 260 may be doped with the electrolyte. Any suitable electrolyte may be disposed within absorbent material 260. For example, a water soluble electrolyte, such as sodium bicarbonate, sodium chloride or potassium sulfate, may be disposed within absorbent material 260. It should be understood that absorbent material 260 need not be a single, continuous piece of material. Thus, e.g., absorbent material 260 may be constructed of or with a plurality of absorbent pieces positioned adjacent each other.

As discussed above, RFID tag 244 may be inoperable or signal communication between RFID tag 244 and RFID reader 242 may be diminished, e.g., if liquid is disposed within absorbent material 260 at second end portion 264 of absorbent material 260. For example, liquid within absorbent material 260 at second end portion 264 of absorbent material 260 may short out the antenna of RFID tag 244. As another example, a resistance of absorbent material 260 can decrease (e.g., due to the electrolyte therein dissolving) thereby putting a load on the antenna of RFID tag 244. As the resistance drops, the load can increase until the load drains sufficient power from RFID tag 244 such that RFID tag 244 is disabled or deactivated and signal communication between RFID reader 242 and RFID tag 244 is disrupted or terminated. Further, when absorbent material 260 is wet, e.g., such that the electrolyte within absorbent material 260 is dissolved, the capacitance of the antenna of RFID tag 244 may be a second capacitance value. The second capacitance value can be selected such that the signal communication between RFID reader 242 and RFID tag 244 is disrupted or terminated due to the associated change in the resonant frequency of RFID tag 244.

As may be seen in FIG. 6, system 240 also includes an impermeable material 270. Impermeable material 270 may be positioned over RFID tag 244 and/or absorbent material 260. As an example, impermeable material 270 may be mounted to filter cartridge 230 at outer surface 238 of filter cartridge 230. Thus, impermeable material 270 may assist with mounting or securing RFID tag 244 and/or absorbent material 260 to filter cartridge 230.

Impermeable material 270 defines a passage 272 therethrough. Passage 272 permits liquid to flow through impermeable material 270, e.g., to absorbent material 260 disposed below impermeable material 270. As an example, passage 272 of impermeable material 270 may be positioned at or adjacent the liquid collection location, and first end portion 262 of absorbent material 260 may be positioned at or adjacent passage 272 of impermeable material 270. Thus, impermeable material 270 may be positioned between the liquid collection location and absorbent material 260, and passage 272 may permit liquid to flow through impermeable material 270 to absorbent material 260. In particular, absorbent material 260 may be configured or positioned for wicking liquid from passage 272 of impermeable material 270 at first end portion 262 of absorbent material 260 to second end portion 264 of absorbent material 260 and RFID tag 244. Thus, impermeable material 270 may assist with hindering or preventing absorbent material 260 from collecting or absorbing liquid from locations other than the liquid collection location.

FIG. 9 provides an elevation view of a system 300 for detecting liquid water according to an exemplary embodiment of the present subject matter. FIG. 10 provides a plan view of certain components of system 300. In FIG. 9, system 300 is shown with filter cartridge 230. It should be understood that system 300 may be used to detect liquid water and/or water leaks in any other suitable setup or arrangement in alternative exemplary embodiments. Thus, while described in the context of filter cartridge 230, system 300 may be used to detect water leaks from any suitable container, vessel, pipe or conduit or to detect liquid water in the container, vessel, pipe or conduit or on the surface in alternative exemplary embodiments. In addition, system 300 may also be arranged or configured to detect any other suitable liquid in alternative exemplary embodiments.

System 300 includes similar components as system 240 (FIG. 6) described above. Thus, system 300 may function in a similar manner to detect liquid. As may be seen in FIGS. 9 and 10, system 300 includes an RFID tag 310, a hydroscopic or absorbent layer or material 320, and an impermeable layer or material 330. Absorbent material 320 extends between a passage 332 of impermeable material 330 and RFID tag 310 beneath impermeable material 330. Thus, absorbent material 320 may wick liquid from passage 332 of impermeable material 330 to RFID tag 310.

Impermeable material 330 may be constructed of or with any suitable impermeable material 330. For example, impermeable material 330 may be constructed of or with a material that is impermeable to the liquid being detected by system 300. In certain exemplary embodiments, impermeable material 330 may be a, e.g., flexible, plastic film or layer. In addition, impermeable material 330 may further include an adhesive, such as a pressure sensitive adhesive, disposed on the plastic film. Thus, impermeable material 330 may act as a sticker or tape to assist with mounting absorbent material 320 and RFID tag 310 to a surface. In such a manner, system 300 may be easily mountable at or adjacent a liquid collection location.

FIG. 11 provides an elevation view of a system 400 for detecting liquid water according to another exemplary embodiment of the present subject matter. FIG. 12 provides an exploded view of system 400. In FIGS. 11 and 12, system 400 is shown with filter cartridge 230. It should be understood that system 400 may be used to detect liquid water and/or water leaks in any other suitable setup or arrangement in alternative exemplary embodiments. Thus, while described in the context of filter cartridge 230, system 400 may be used to detect water leaks from any suitable container, vessel, pipe or conduit or to detect liquid water in the container, vessel, pipe or conduit or on the surface in alternative exemplary embodiments. In addition, system 400 may also be arranged or configured to detect any other suitable liquid in alternative exemplary embodiments.

System 400 includes similar components as system 240 (FIG. 6) described above. Thus, system 400 may function in a similar manner to detect liquid. As may be seen in FIGS. 11 and 12, system 400 includes an RFID tag 410, a hydroscopic or absorbent material 420, and an impermeable material 430. Absorbent material 420 extends between a first end portion 424 and a second end portion 426. First end portion 424 of absorbent material 420 is positioned at, e.g., directly beneath, passages 432 of impermeable material 430, and second end portion 426 of absorbent material 420 is positioned over RFID tag 410. Thus, absorbent material 420 may extend beneath impermeable material 430 between passages 432 and RFID tag 410. In addition, absorbent material 420 may wick liquid from passages 432 of impermeable material 430 to RFID tag 410. In system 400, absorbent material 420 is constructed of or with a foam material, such as cellulose foam or synthetic foam. System 400 also includes features for hindering, e.g., mechanical, compression of absorbent material 420, as discussed in greater detail below.

FIGS. 13, 14 and 15 provide schematic views of certain components of system 400. In FIG. 13, absorbent material 420 is dry such that pores 422 of absorbent material 420 contain little or no liquid therein. In FIG. 14, absorbent material 420 is damp such that pores 422 of absorbent material 420 contain liquid therein. Absorbent material 420 may be damp, e.g., when absorbent material 420 is exposed to condensation or positioned in a humid environment. In FIG. 15, absorbent material 420 is saturated such that pores 422 of absorbent material 420 are filled with liquid. Absorbent material 420 may be saturated, e.g., when absorbent material 420 is exposed to or contacts a pool of liquid.

In system 400, absorbent material 420 contains an electrolyte, such as sodium bicarbonate, sodium chloride or potassium sulfate, therein. The electrolyte within absorbent material 420 may not dissolve or may not completely dissolve when absorbent material 420 is damp as shown in FIG. 14. Conversely, the electrolyte within absorbent material 420 may, e.g., completely, dissolve and ionize when absorbent material 420 is saturated as shown in FIG. 15. Thus, a conductivity of absorbent material 420 may increase when absorbent material 420 is saturated thereby putting a load on the antenna of RFID tag 410. As the conductivity increases, the load can increase until the load drains sufficient power from RFID tag 410 such that RFID tag 410 is disabled or deactivated and signal communication between an associated RFID reader and RFID tag 410 is disrupted or terminated.

As will be understood by those skilled in the art, compressing absorbent material 420 decreases a size of pores 422 and decreases a volume of liquid required to saturate absorbent material 420. Thus, a sensitivity of absorbent material 420 may be increased by compressing absorbent material 420. However, system 400 may be disposed in a damp environment, such as an area with high condensation or high humidity. To avoid triggering system 400 with such condensation or humidity, system 400 also includes features for hindering compression of absorbent material 420, e.g., and thereby decrease a sensitivity of system 400.

Turning back to FIGS. 11 and 12, impermeable material 430 includes a rigid casing 436. Rigid casing 436 is positioned over absorbent material 420 and RFID tag 410. As an example, rigid casing 436 may be mounted to filter cartridge 230 at outer surface 238 of filter cartridge 230. Rigid casing 436 may be constructed of or with any suitable rigid material 330. For example, rigid casing 436 may be constructed of or with a rigid material that is impermeable to the liquid being detected by system 400. In certain exemplary embodiments, rigid casing 436 may be a rigid plastic, such as polystyrene, polyethylene, polyvinyl chloride, polypropylene, etc.

As may be seen in FIGS. 11 and 12, rigid casing 436 defines passages 432. Rigid casing 436 also defines at least one vent opening 434. Vent opening 434 is positioned, e.g., directly, over second end portion 426 of absorbent material 420 and/or RFID tag 410. Vent opening 434 may permit or facilitate evaporation of liquid in absorbent material 420 at second end portion 426 of absorbent material 420. It should be understood that rigid casing 436 need not include vent opening 434 in alternative exemplary embodiments.

Turning now to FIGS. 13, 14 and 15, rigid casing 436 defines an interior volume 438. Absorbent material 420 may be positioned or disposed within interior volume 438 of rigid casing 436, e.g., such that absorbent material 420 is encased or enclosed within rigid casing 436. In such a manner, rigid casing 436 may hinder or prevent compression of absorbent material 420.

System 400 may also include a liquid or water permeable layer or material 440 positioned between RFID tag 410 and absorbent material 420, e.g., within interior volume 438 of rigid casing 436. Water permeable material 440 may be any suitable water permeable material. For example, water permeable material 440 may be a plastic mesh, such as a polypropylene mesh, in certain exemplary embodiments. Water permeable material 440 spaces RFID tag 410 and absorbent material 420, e.g., while permitting liquid to pass from absorbent material 420 to RFID tag 410 through water permeable material 440. Such spacing may assist with hindering or preventing triggering of system 400 in damp environments, e.g., due to condensation or humidity. Thus, water permeable material 440 may assist with decreasing a sensitivity of system 400.

As may be seen in FIGS. 13, 14 and 15, absorbent material 420 is spaced apart from RFID tag 410 by a gap G, e.g., along the lateral direction L or the transverse direction T. The gap G may be any suitable size. For example, gap G may be less than about three millimeters, less than about two millimeters or less than about a millimeter. Thus, absorbent material 420 may be spaced apart from RFID tag 410 by less than about three millimeters, less than about two millimeters, less than about a millimeter, etc., within interior volume 438 of rigid casing 436.

Water permeable material 440 may be positioned within and extend across the gap G. Thus, water permeable material 440 may extend between absorbent material 420 and RFID tag 410 within the gap G. Rigid casing 436 also includes at least one spacer 442 that extends across the gap G to RFID tag 410. In alternative exemplary embodiments, spacer 442 may extend through interior volume 438 of rigid casing 436 across the gap G to RFID tag 410. Spacer 442 may be integral or continuous with rigid casing 436. Thus, as an example, spacer 442 and rigid casing 436 may be constructed of a single piece of molded plastic. Spacer 442 may be used in addition to water permeable material 440 as shown in FIGS. 13, 14 and 15 or without water permeable material 440. In alternative exemplary embodiments, any suitable combination of water permeable material 440 and spacer 442 may be used to space absorbent material 420 from RFID tag 410.

FIG. 16 illustrates a method 500 for treating foam according to an exemplary embodiment of the present subject matter. Method 500 may be used to treat any suitable foam. For example, method 500 may be used to treat absorbent material 260 of system 240 (FIG. 6), absorbent material 320 of system 300 (FIG. 9) and/or absorbent material 420 of system 400 (FIG. 11). Utilizing method 500, a thickness of such absorbent materials may be reduced to a suitable thickness for use in the systems.

At step 510, a foam blank is provided. The foam blank may be any suitable foam. For example, the foam blank may be cellulose foam or synthetic foam. In addition, the foam blank may be cut to size at step 510. In alternative exemplary embodiments, the foam blank may be cut to size at any other suitable time.

At step 520, the foam blank is treated with an electrolyte. Thus, an electrolyte may be disposed within the foam blank at step 520. As an example, foam blank may be exposed to an electrolyte solution at step 520 by spraying the foam blank with the electrolyte solution or soaking the foam blank in the electrolyte solution. The electrolyte may be any suitable electrolyte at step 520. As an example, the electrolyte may have a low hygroscopicity. As another example, the electrolyte may include a non-deliquescent electrolyte such that the electrolyte is not deliquescent. Thus, the electrolyte may not absorb water out of the atmosphere. As a particular example, the electrolyte disposed within the foam blank at step 520 may include sodium bicarbonate, sodium chloride and/or potassium sulfate.

At step 530, the foam blank is compressed. In particular, the foam blank may be compressed such that a thickness of the foam blank is reduced a step 530. For example, the foam blank may have a first surface and a second surface positioned opposite each other on the foam blank, and the foam blank may be compressed at step 530 such that the first and second surfaces of the foam blank are spaced apart from each other by less than about three hundredths of an inch during step 530.

At step 540, the foam blank is dried, e.g., while the foam blank is compressed. As an example, the foam blank may be heated to assist with drying the foam blank at step 540. In particular, the foam blank may be heated in a hot press such that the first and second surfaces of the cellulose foam are spaced apart from each other by less than about three hundredths of an inch during step 540.

In such a manner, a foam blank, such as a piece of cellulose foam, may be treated with an electrolyte and compressed in order to reduce the thickness of the foam blank. In particular, the thickness of the foam blank may be greater than about three hundredths of an inch (e.g., greater than about six hundredths of an inch) before step 530, and the thickness of the foam blank may be less than about three hundredths of an inch after step 540.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly for filtering a liquid, comprising:
   a filter cartridge with a filter medium disposed therein, the filter cartridge having an outer surface, the filter medium for removing contaminants from the liquid;
   a radio frequency identification, RFID, tag positioned at the outer surface of the filter cartridge, wherein the RFID tag is configured to detect liquid leaking;
   an absorbent material positioned on the RFID tag;
   a water impermeable rigid casing mounted to the filter cartridge at the outer surface of the filter cartridge, the water impermeable rigid casing positioned over the absorbent material and the RFID tag such that the water impermeable rigid casing prevents compression of the absorbent material against the filter cartridge, the water impermeable rigid casing mounted to the outer surface of the filter cartridge such that the water impermeable rigid casing overlays the RFID tag and the absorbent material on the outer surface of the filter cartridge and such that the RFID tag and the absorbent material are encased between the water impermeable rigid casing and the outer surface of the filter cartridge, the water impermeable rigid casing defines at least one opening that extends through the water impermeable rigid casing, the water impermeable rigid casing preventing the absorbent material from absorbing liquid leaking from the filter cartridge at locations other than the at least one opening, the absorbent material positioned at the at least one opening of the water impermeable rigid casing; and
   a water permeable material extending between the RFID tag and the absorbent material within the water impermeable rigid casing, the RFID tag positioned opposite the absorbent material about the water permeable material, the water permeable material having a thickness, the absorbent material spaced apart from the RFID tag by at least the thickness of the water permeable material, the thickness of the water permeable material being less than three millimeters such that the water permeable material hinders disabling of the RHD tag due to condensed liquid from an ambient atmosphere disposed within the absorbent material,
   wherein the absorbent material is positioned at the at least one opening of the water impermeable rigid casing such that liquid leaking is transferable from the at least one opening of the water impermeable rigid casing to the RFID tag via the absorbent material and through the water permeable material, and
   wherein the absorbent material extends longitudinally between a first end portion and a second end portion within, the water impermeable rigid easing, the first end portion of the absorbent material positioned at the at least one opening of the water impermeable rigid casing, the RFID tag positioned at the second end portion of the absorbent material such that the RFID tag is not positioned directly below the at least one opening of the water impermeable rigid casing within the water impermeable rigid casing.

2. The water filter assembly of claim 1, wherein the water permeable material comprises a plastic mesh.

3. The water filter assembly of claim 1, wherein the absorbent material comprises cellulose foam doped with an electrolyte.

4. The water filter assembly of claim 1, further comprising an electrolyte disposed within the absorbent material.

5. The water filter assembly of claim 4, wherein the electrolyte comprises sodium bicarbonate, sodium chloride or potassium sulfate.

6. The water filter assembly of claim 1, wherein the absorbent material is spaced apart from the MID tag by a gap such that the RFD tag does not contact the absorbent material.

7. The water filter assembly of claim 6, wherein the water impermeable rigid casing comprises at least one spacer that extends across the gap to the RFID tag.

8. The water filter assembly of claim 1, wherein the water permeable material has a thickness, the absorbent material also having a thickness, the absorbent material spaced apart from the RFID tag by at least the thickness of the water permeable material, the thickness of the water permeable material being less than three millimeters, the thickness of the absorbent material being less than three hundredths of an inch.

9. The water filter assembly of claim 3, wherein the cellulose foam has a thickness, the thickness of the cellulose foam being less than three hundredths of an inch.

* * * * *